Patented May 1, 1945

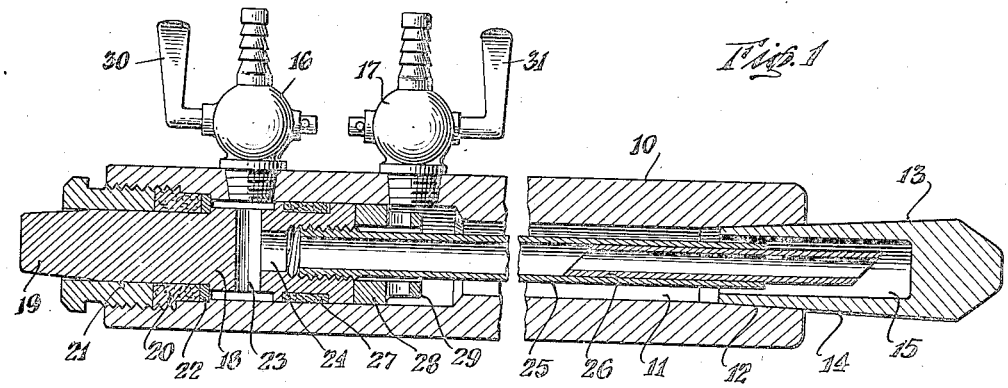
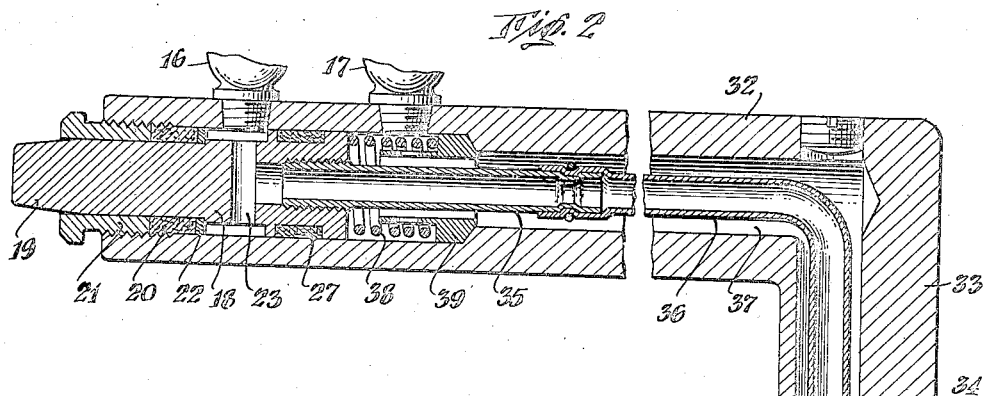
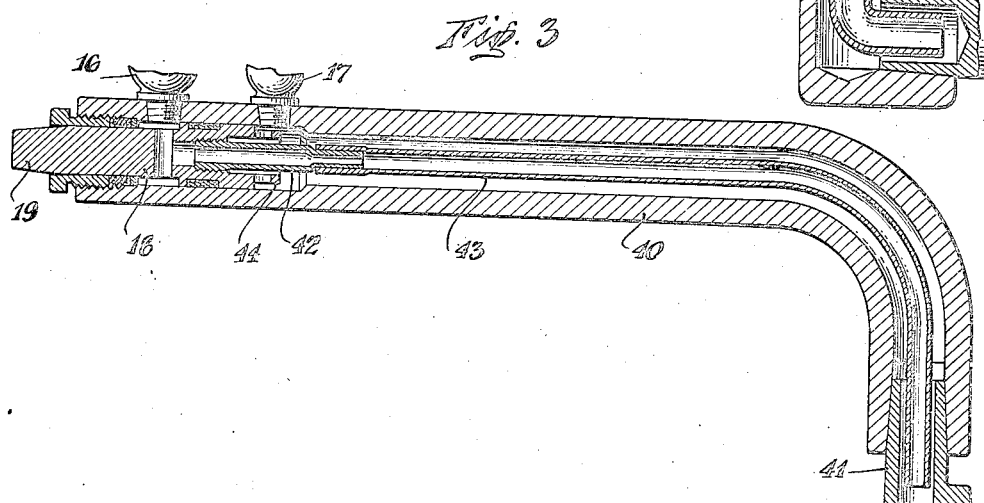

2,374,979

UNITED STATES PATENT OFFICE 2,374,979

WELDING ELECTRODE HOLDER

Chester F. Carlson, Jackson Heights, N. Y., and Edman F. Holt and Robert F. Huddleston, Indianapolis, Ind., assignors to P. R. Mallory & Co., Inc., Indianapolis, Ind., a corporation of Delaware Application March 18, 1943, Serial No. 479,618

5 Claims. (Cl. 219—4)

This invention relates to welding electrode holders for resistance welding.

An object of the invention is to improve ejector-type welding electrode holders.

Other objects of the invention will be apparent from the description and claims.

In the drawing:

Figures 1, 2 and 3 show three different modifications of welding electrode-holders embodying features of the present invention.

Resistance welding electrodes are usually supported in a welding machine by a welding electrode holder which supplies cooling water or other liquid to the inside of the electrode. The electrodes are usually tapered to fit into a tapered socket in the electrode holder and the holder is provided with a water supply tube extending into a recess in the electrode to carry the cooling water into the electrode.

It frequently becomes necessary to remove the welding electrodes to replace them when they wear out or become deformed, or to substitute different electrodes for different types of work. Since the tapered fit between the electrode and holder must be extremely tight to insure good electric conductivity and mechanical support and to prevent water leakage, the removal of the electrodes is often quite difficult. In the past, the electrodes have usually been removed by using a wrench or similar tool. More recently, ejector-type welding electrode holders have been developed such as the holder shown and described in Hensel and Larsen Patent 2,215,289 which includes a "knock out" plug extending through the rear end of the holder so that the electrode can be removed by driving the plug against the inner end of the welding electrode to eject it. A similar arrangement has been applied to electrode holders having a long, straight barrel in which case the ejector member comprises a long tubular sleeve extending for nearly the entire length of the barrel between the barrel wall and the central cooling water supply tube.

This has the objection that the ejector sleeve obstructs the water passage so as to seriously decrease the available flow of cooling water. Moreover, this arrangement is unsuitable for electrode holders of odd shapes such as those having a bend or off-set portion.

A feature of the present invention resides in the use of the water contained within the electrode holder for ejecting the welding electrode. This is accomplished by providing a piston or plunger at some suitable point on the electrode holder together with valves for closing the water inlet and outlet passages. Then, by striking the plunger, sufficient hydrostatic pressure is applied to the water within the holder to eject the electrode. The invention is especially useful for holders of odd shapes or odd geometric design. It may also be employed within the welding arm itself in certain welders.

Referring to the drawing, Figure 1 shows a barrel type holder 10 having a hollow interior 11 ending in a tapered socket 12 in which is fitted a welding electrode 13 having a tapered outer surface 14 and a water cooling recess 15 therein. The barrel 10 of the holder is adapted to be clamped in an arm of a welding machine.

A water inlet valve 16 and water outlet valve 17 are screwed into the wall of the holder near its rear end, the valve passage communicating with the hollow interior of the holder.

The hollow interior is of somewhat larger diameter near its rear end and a plunger 18 is fitted to slide therein. Plunger 18 has a projecting end 19 which extends out of the rear end of the holder. A packing ring is compressed around the plunger in the rear end of the holder by a threaded sleeve 21 and washer 22 to prevent water leakage around the plunger 18. A shoulder on the plunger cooperates with washer 22 to limit the outward travel of the plunger.

The mid-portion of the plunger 18 has a transverse bore 23 formed therein and a communicating axial bore 24 extending toward the welding electrode. The diameter of plunger 18 is sufficiently less than the bore of the holder in the vicinity of passage 23 to permit water circulation around the plunger at this point. During normal operation, passage 23 is substantially aligned with the water passage of valve 16.

A water supply tube 25 is threaded into the passage 24 at the inner end of the plunger and has a telescoping tube portion 26 which can be extended to project into recess 15 of the electrode.

A second packing ring 27 surrounds the plunger 18 between valves 16 and 17 to prevent bypass of water from the inlet to the outlet. A sleeve 28 of metal or rubber having a perforated extension 29 thereon is disposed in the larger diameter part of the bore 11 to limit the travel of plunger 18 into the bore. This may in some cases be made integral with the plunger, or if end 19 is of sufficient length it may be eliminated.

When the holder is in use, valves 16 and 17 are open and are connected to water supply and return hoses respectively so that circulating water enters through valve 16 and passages 23 and 24 and passes downward through tubes 25 and 26 to the hollow interior 15 of the welding electrode where it absorbs heat and returns around the outside of tube 25 to water outlet valve 17.

Should it be desired to remove electrode 13, it is only necessary to close valves 16 and 17 by turning the handles 30 and 31 to "closed" position. The electrode may then be removed by striking the projecting end 19 of the plunger thereby applying hydrostatic pressure to the water within the passages of the holder sufficient to drive out the welding electrode. If desired, a cloth or container may be placed over the end of the electrode and holder to catch the electrode as it is ejected along with some of the water from the holder.

Figure 2 shows a modification comprising a holder 32 having an off-set end 33 holding an electrode 34 therein. In this modification, the small internal water supply tube 35 may have an end section 36 of rubber or other flexible material to permit conveying the water supply around the bends in the passageway 37 of the holder.

A plunger return spring 38 is provided between the inner end of the plunger and a sleeve 39 (which rests against a shoulder inside the holder) to return the plunger to its rearward position after an electrode has been ejected.

Figure 3 shows a further modification comprising a holder 40 having its end curved to support electrode 41 at right angles to the main body of the holder. The interior water supply tube 42 has a section 43 of flexible rubber or metal to convey the water around the bend in the holder. The arrangement of plunger 18 and the water passage are otherwise similar to Figure 1. Perforated extension 44 is integral with the plunger and limits the inward travel of the plunger by coming in contact with the shoulder in the bore.

The present invention provides an ejector type welding electrode holder of simpler and more economical construction than those used heretofore since an ejector sleeve within the holder is not required. The elimination of the sleeve likewise increases the water carrying capacity of the holder by removal of obstructions in the water passage. The ejector feature is also applicable to holders of odd shapes where a sleeve type ejector could not be used.

While specific embodiments of the invention have been described, it is intended to cover the invention broadly within the spirit and scope of the appended claims.

What is claimed is:

1. A welding electrode holder comprising a hollow body, a socket therein for receiving a welding electrode, liquid inlet and outlet conduits communicating with the hollow interior of said body, valves for closing said conduits, a piston member for changing the volume of said hollow interior, and external means for moving said piston member to dislodge said electrode solely by hydraulic pressure.

2. A welding electrode holder comprising a hollow body, a socket therein for receiving a welding electrode, said socket communicating with the hollow interior of said holder, liquid inlet and outlet conduits extending through the wall of said body into the hollow interior thereof, valves for closing said conduits, and a plunger extending through said wall for applying hydrostatic pressure to liquid in said hollow interior for ejecting said electrode without direct engagement therewith by striking or applying pressure to the external end of said plunger.

3. A welding electrode holder comprising a tubular body, the hollow interior thereof extending throughout its length and terminating at one end in a tapered socket for receiving a welding electrode, a plunger closing the other end of said hollow interior with one end thereof normally projecting out of the end of said body, said plunger thereby being capable of varying the volume of said hollow interior by longitudinal movement, liquid inlet and outlet conduits leading into the hollow interior of said body and valves for closing said conduits, said plunger being free of any direct mechanical driving connection with said electrode but being capable of ejecting said electrode by applying hydrostatic pressure to liquid filling said hollow interior when said valves are closed and an extreme force is applied to said plunger.

4. A welding electrode holder comprising a tubular body, the hollow interior thereof extending throughout its length and terminating at one end in a tapered socket for receiving a welding electrode, a plunger closing the other end of said hollow interior with one end thereof normally projecting out of the end of said body, liquid inlet and outlet conduits leading into the hollow interior of said body, and a spring compressible by the inward movement of said plunger for returning said plunger to normal position after it has been moved into said body, whereby ejection of a welding electrode from said socket may be effected by depressing said plunger when said holder is filled with liquid.

5. A welding electrode holder comprising a tubular body, the hollow interior thereof extending throughout its length and terminating at one end in a tapered socket for receiving a welding electrode, a plunger closing the other end of said hollow interior with one end thereof normally projecting out of the end of said body, liquid inlet and outlet conduits leading into the hollow interior of said body, valves in said conduits, and a spring compressible by the inward movement of said plunger for returning said plunger to normal position after it has been moved into said body, a fluid sealing ring around said plunger and shoulders on said body to limit the inward and outward travel of said plunger, said plunger being free of any direct mechanical driving connection with said electrode but being capable of ejecting said electrode responsive to external force applied thereto by applying hydrostatic pressure to liquid filling the hollow interior of said body, when said valves are closed.

CHESTER F. CARLSON.
EDMAN F. HOLT.
ROBERT F. HUDDLESTON.